Patented Nov. 5, 1940

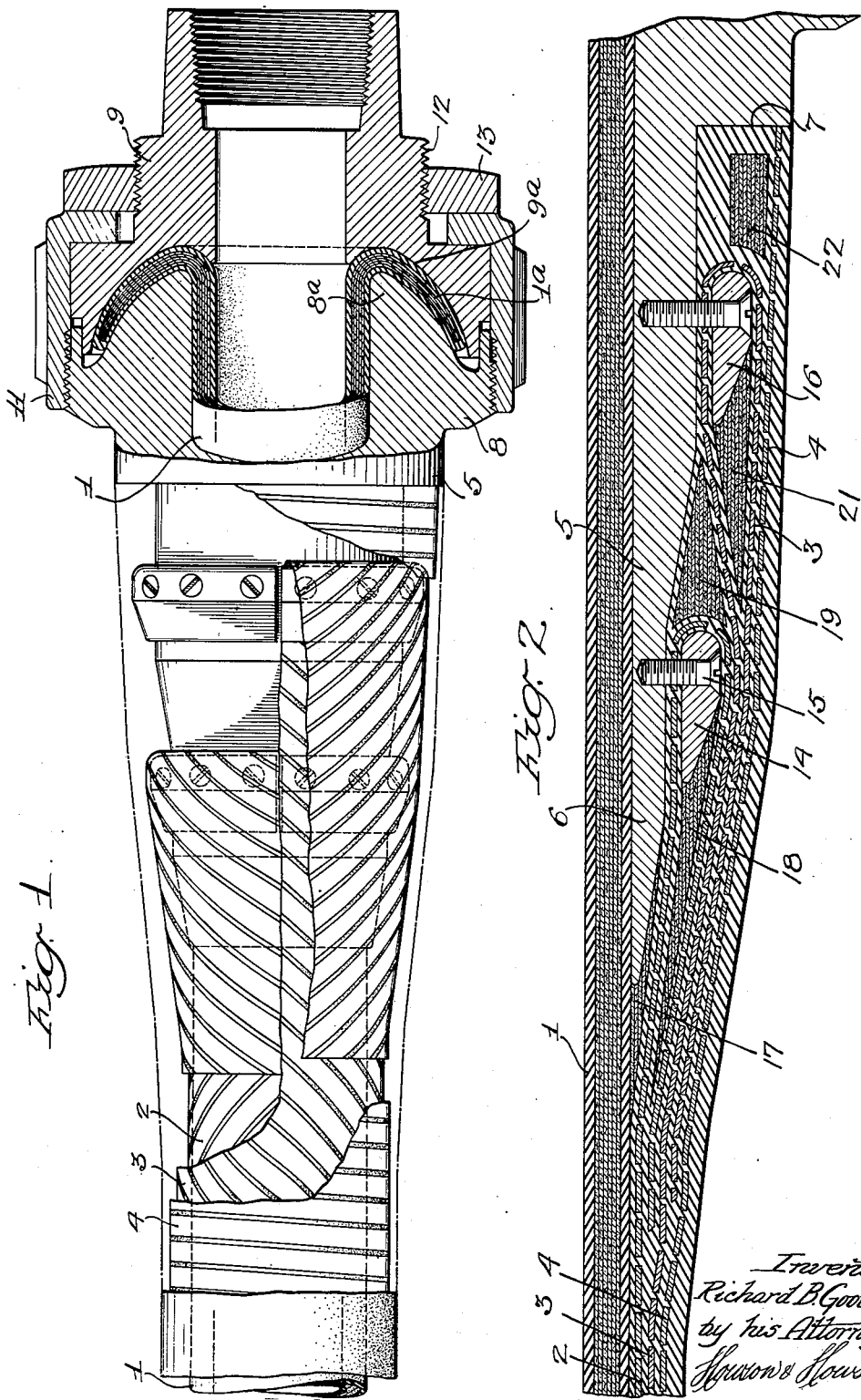

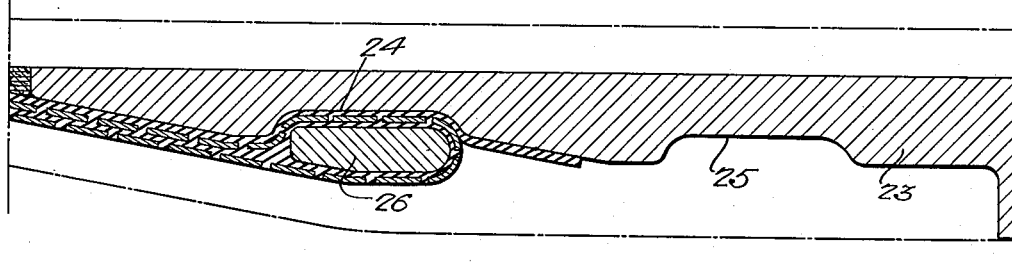
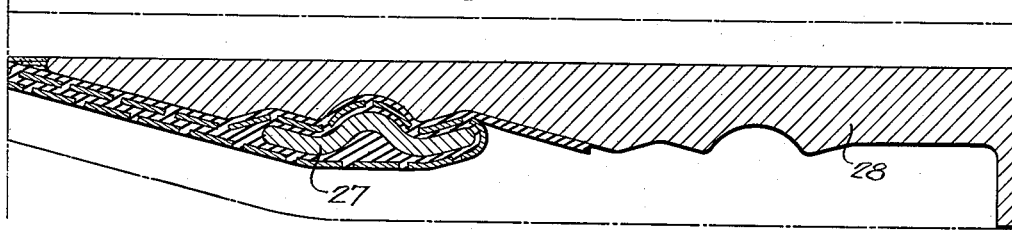
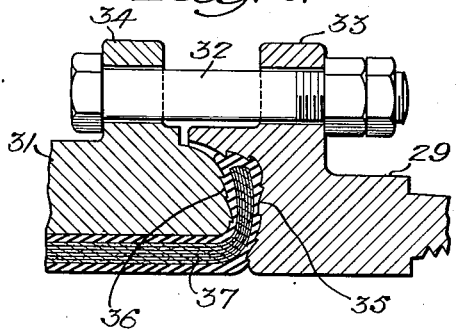
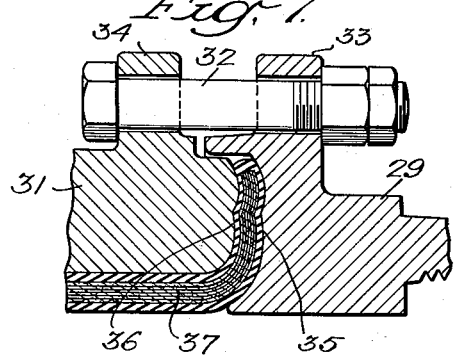
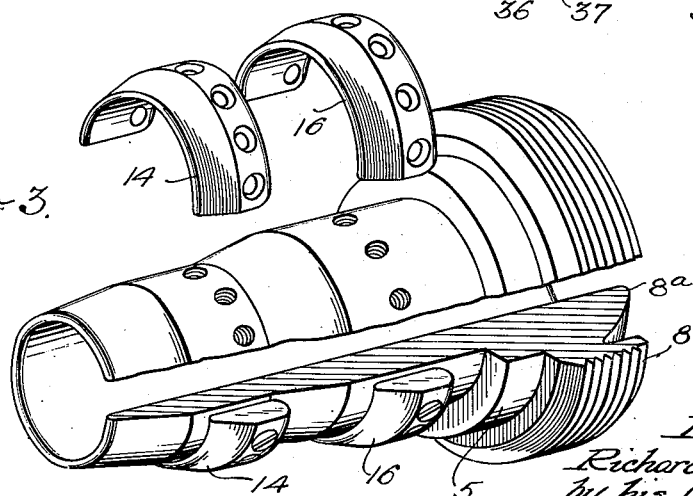

2,220,785

UNITED STATES PATENT OFFICE 2,220,785

ROTARY HOSE COUPLING CONSTRUCTION

Richard B. Goodall, Aldan, Pa., assignor to Dixon Valve & Coupling Company, Philadelphia, Pa., a corporation of Pennsylvania Application May 2, 1938, Serial No. 205,634

6 Claims. (Cl. 285—71)

The invention relates to improvements in hose couplings, and more specifically to couplings for rotary hose.

A principal object of the invention is to provide a coupling structure of the built-in type which shall be characterized by relatively great strength and durability, compactness of form and relative simplicity of manufacture.

Another object of the invention is to provide a coupling construction affording throughout both hose and coupling an inside diameter that is substantially uninterrupted and of uniform dimension.

Still another object of the invention is to provide a coupling structure wherein the structural members of the hose are mechanically interlocked and anchored to the base element of the coupling so that the latter forms with the hose what in effect is an integrated unitary structure.

A further object of the invention is to provide a coupling structure wherein the principal element of the coupling is effectively insulated and protected against abrasive action of materials passing through the hose.

A still further object of the invention is to provide in a coupling of the stated character novel and improved means for effecting a seal between the coupling base member, which is secured in the hose end, and a detachable head section by means of which the hose is attached to a pipe or other fitting.

Another object of the invention is to provide a novel coupling and hose end construction reinforcing the adjoining end of the hose body and to the coupling itself, as hereinafter set forth.

Still another object of the invention is to provide a novel and generally improved built-in coupling construction which shall be applicable to any of the conventional and commercial hose.

A still further object of the invention is to provide a coupling construction which shall be applicable to hose as manufactured under the present specifications without requiring the installation of special handling equipment, materials or tools.

The invention further resides in certain novel structural features and details hereinafter described and illustrated in the attached drawings, in which:

Figure 1 is a longitudinal partial sectional view of a coupling made in accordance with my invention;

Fig. 2 is an enlarged fragmentary sectional view of the left-hand portion of the coupling shown in Fig. 1;

Fig. 3 is a sectional perspective view of parts of the coupling device;

Figs. 4 and 5 are, respectively, fragmentary sectional views illustrating modifications of the coupling structure, and Figs. 6 and 7 are fragmentary sectional views illustrating modified details of the coupling.

In Figs. 1 and 2 of the drawings, I have illustrated a conventional type of rotary hose, comprising an inner fabricated section designated by the reference numeral 1 and consisting of inner and outer layers of rubber, and an intervening laminated section of fabric. In accordance with the usual procedure, the outside of this fabricated tubular section is embraced by an envelope consisting in part of rubber and in part of convolutely wound metal strands, these strands in the present instance being applied in three layers designated by the reference numerals 2, 3 and 4, respectively. Insofar as described, the hose departs in no essential respects from the conventional construction.

In accordance with my invention, I provide a coupling consisting of a tubular base member 5 having a generally tapered inner end portion 6 which terminates in a shoulder 7 at the base of an outer flange portion 8. As shown in Fig. 2, this member 5 is so formed as to neatly embrace the inner fabricated section 1 of the hose, which in assembly extends completely through the member 5 and beyond the end of the latter, the projecting end 1a of the inner hose section 1 being turned outwardly and back around the protuberant rounded outer end portion 8a of the flange 8. The coupling further comprises a detachable head member 9 which has at its inner end a recess 9a conforming to the protuberant portion 8a of the flange 8, and this head member 9 is secured to the base member by means of a flanged retaining sleeve 11 which is threaded on the base member 8, as shown in Fig. 1, and which when turned inwardly on said base member draws the head member 9 inwardly against the turned-over end 1a of the inner hose section and securely clamps the said end in the coupling. Preferably, and as shown in Fig. 1, the head member 9 is provided with a threaded portion 12 which receives a nut 13, this latter nut being adapted to be turned inwardly against the flanged outer end of the sleeve 11 to thereby function as a lock nut preventing loosening of the sleeve and consequent release of the clamping pressure upon the end 1a of the inner hose section 1. It is to be noted that in this device the inner hose section is not only securely clamped in the coupling members, but in addition the clamped portion of the inner hose section functions to tightly seal the juncture between the base member 5 of the coupling and the head member 9. It will be noted further that the hose section 1 functions as an insulating liner for the base member 5 of the coupling, and that by reason of the complementary form of the base and head members of the coupling, the inner diameter of the hose 1 is maintained in substantial continuity and uniformity throughout the coupling. Still further, the only element of the coupling not protected by the insulating liner afforded by the hose section 1, namely, the head piece 9, is detachable and may readily be replaced if, by reason of wear, such replacement becomes necessary.

In accordance with my invention, the reinforcing wires of the inner layer 2 are carried outwardly around the inner tapered end 6 of the base member 5 of the coupling and are clamped solidly to the base member by means of a sectional clamping ring 14, see Figs. 2 and 3, the sections of this ring being secured in clamping relation to the base member by means of screws 15. The inner edges of the ring elements 14 are tapered as shown, and the outer edges are rounded, and the ends of the convolutely wound wires of the inner layer 2 are carried over the outer rounded edge and are turned back over the inner end 6 of the coupling member and along the body of the hose 1 to any desired extent, as shown in Fig. 2. Similarly the wires of the layer 3 are carried outwardly over the ring 14 and are clamped solidly to the base member 5 of the coupling by a sectional clamping ring 16 corresponding to the ring 14 previously described and secured to the base member 5 in similar manner. The wires 3 are carried around the outer edges of the sections of the ring 16 and rearwardly to the desired extent as illustrated.

As shown in Fig. 2, the wires of the layers 2, 3 and 4 embracing the fabricated inner hose section 1 are embedded in rubber, and this rubber casing is extended to those portions of the wires which embrace the clamps 14 and 16. The spaces between these rubber cased wires and the base member 5 of the coupling are built up and completely filled with layers of fabric, as indicated at 17, 18, 19 and 21. The space between the clamp 16 and the shoulder 7 of the base member 5 is also built up with rubber together with an annulus 22 of laminated fabric, and the wires 4 of the outer convolute layer are extended through the rubber carcass and outwardly of the reinforcing annulus 22 and terminate at the shoulder 7.

It is to be noted that in this manner the structural elements of the hose, inclusive of the inner fabricated portion 1 and the layers 2 and 3 of the reinforcing wires, are solidly clamped and thereby mechanically and positively united with the metallic elements of the coupling; and further that the base member 5 of the coupling constitutes in effect a built-in element of the hose structure, being so united with the hose as to preclude displacement. It is to be noted further that the structure is such that the end portion of the hose within which the base member 5 of the coupling is secured is reinforced and protected to an extent affording a maximum of strength and durability in the structure as a whole, and that this reinforcement may readily be extended back along the body of the hose to any desired extent. In this respect, the end assembly lends itself more generally to reinforcement of the critical section in the coupling area than any of prior hose-end constructions. Attention is also directed to the fact that the construction requires no interruption of the continuity of the smooth outer surface of the hose up to the outer or flanged end portion of the coupling body.

While, for the purpose of illustrating the invention, the coupling construction has been described in conjunction with a conventional hose employing metallic reinforcing wires arranged in three superimposed layers, it will be apparent that the construction is applicable to other hose employing structural members other than the metal wires, and also to hose wherein the structural members, either metallic or non-metallic, are in one layer or a plurality. In the specific embodiment illustrated, the outer series of wires 4 have been described as extending throughout the length of the hose, but they could without departure from the invention be confined entirely to the coupling area, their function in that case being primarily to bind in and securely hold the turned back ends of the wires of the series 3 and 4.

It is to be noted further that the invention is not restricted to the use of any specific number of clamps for retaining the structural members of the hose. In the illustrated embodiment, for example, one of the clamping members 14 and 16 might be eliminated, and in that case the associated structural members of the hose might or might not be held by the remaining clamp. In an alternative construction, the structural members of the hose might be run continuously and in several superimposed layers throughout the length of the hose, passing at the end of each run under and around one of the clamping elements and being extended back through the carcass of the hose to the opposite end.

In Figs. 4 and 5, I have illustrated modifications of the clamping device for the reinforcing wires of the hose structure. In the modification of Fig. 4, the outer surface of the base member 23 of the coupling is provided with annular recesses 24 and 25 for reception of the correspondingly contoured clamping rings 26. In the modification illustrated in Fig. 5, clamping rings 27 are employed of somewhat different shape, and the base member 28 of the coupling is provided with correspondingly shaped annular recesses for their reception.

In Fig. 6, the head member 29 of the coupling is secured to the base member 31 by means of bolts 32 which pass through flanges 33 and 34 on the respective members. In this case also, the clamping and sealing surfaces 35 and 36 of the head and base members are formed so as to provide both an efficient clamp for the end of the inner hose section 37 and also to resist the tendency of the pressure in the interior of the hose and coupling to displace the turned-out end of the inner hose section 37 outwardly between the clamped members. A variation of this same device is illustrated in Fig. 7, wherein the corresponding parts are designated by the same reference numerals employed in Fig. 6.

There may be still further modification without departure from the invention as defined in the appended claims.

I claim:

1. A hose-end construction consisting of a tubular member embedded in the wall of the hose between the inner and outer surfaces of the latter, and adjustable means connected to the tubular member and also embedded in said wall for positively clamping an internal structural element of the hose to said member.

2. A hose-end construction consisting of a tubular member embedded in the wall of the hose between the inner and outer surfaces of the latter, adjustable means connected to the tubular member and also embedded in said wall for positively clamping an internal structural element of the hose to said member and other means for positively clamping said member to the inner section of the hose which extends at the inside of said member.

3. In combination, a hose comprising an inner section and an outer reinforcing section, a tubular member extending into an end of said hose between said inner and outer sections, and means for clamping a structural element of said outer section interiorly to the outer surface of said member, said means comprising a substantially annular clamping element embedded with said member in the wall of said hose and embracing said structural element, and adjustable means for tightening said clamping element on the member and against said structural element.

4. In combination, a hose comprising inner and outer sections, a tubular member extending into an end of said hose between said inner and outer sections, a substantially annular clamping element embracing said member in the interior of said outer section, means for tightening said clamping element on said member, and said outer section comprising embedded structural reinforcing elements confined under pressure between the member and said clamp and extended outwardly around the latter and in reverse direction within the hose body.

5. A hose-end construction consisting of a tubular member embedded in the wall of the hose between the inner and outer surfaces of the latter, a clamp element operatively associated with said tubular member and also embedded in said wall, an internal structural element of the hose extending between said tubular member and said clamp element, and adjustable means for tightening the clamp element on the tubular member to thereby forcibly confine said structural element between the clamp element and said member.

6. In combination, a hose comprising an inner section and an outer reinforcing section, a tubular member extending into an end of said hose between said inner and outer sections, the said inner hose section extending beyond and being expanded over the outer end of said tubular member, means for positively clamping the said expanded end of the inner hose section against the outer end surface of the tubular member, and means detachably connected to the tubular member and embedded in the outer section of the hose for positively clamping an internal structural element of the hose to the outside of said member.

RICHARD B. GOODALL.